(12) United States Patent
Cai et al.

(10) Patent No.: US 10,158,802 B2
(45) Date of Patent: Dec. 18, 2018

(54) TRAJECTORY PLANNING FOR VIDEO STABILIZATION

(71) Applicant: INTEL CORPORATION, Santa Clara, CA (US)

(72) Inventors: Xiaoxia Cai, Beijing (CN); Chen Wang, Beijing (CN); Lidong Xu, Beijing (CN); Yi-Jen Chiu, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/502,990

(22) PCT Filed: Sep. 19, 2014

(86) PCT No.: PCT/CN2014/086927
§ 371 (c)(1),
(2) Date: Feb. 9, 2017

(87) PCT Pub. No.: WO2016/041193
PCT Pub. Date: Mar. 24, 2016

(65) Prior Publication Data
US 2017/0230581 A1 Aug. 10, 2017

(51) Int. Cl.
*H04N 5/232* (2006.01)

(52) U.S. Cl.
CPC ..... *H04N 5/23267* (2013.01); *H04N 5/23254* (2013.01)

(58) Field of Classification Search
CPC ........... H04N 5/23267; H04N 5/23254; H04N 5/23248; H04N 5/23258; H04N 5/23264; H04N 5/23251; G06T 7/246; G06T 7/277; G06T 2207/10016
See application file for complete search history.

(56) References Cited

U.S. PATENT DOCUMENTS

| | | | |
|---|---|---|---|
| 6,211,913 B1 * | 4/2001 | Hansen | H04N 5/23248 348/218.1 |
| 7,746,934 B2 * | 6/2010 | Chen | H04N 19/51 375/240 |
| 8,384,787 B2 | 2/2013 | Wu | |
| 9,854,168 B2 * | 12/2017 | Wu | H04N 5/23267 |
| 2008/0112630 A1 * | 5/2008 | Nestares | H04N 5/144 382/236 |
| 2012/0162454 A1 * | 6/2012 | Park | H04N 5/145 348/208.6 |
| 2013/0120600 A1 | 5/2013 | Jin | |

OTHER PUBLICATIONS

International Searching Authority at the State Intellectual Property Office of the P.R. China (ISA/CN), International Search Report and Written Opinion for International Patent Application No. PCT/CN2014/086927, dated Jun. 19, 2015, 10 pages.

\* cited by examiner

*Primary Examiner* — Luong T Nguyen
(74) *Attorney, Agent, or Firm* — Womble Bond Dickinson (US) LLP

(57) ABSTRACT

Trajectory planning is described for video stabilization. In one example, a sequence of video frames is received and low-pass filtered. If a subset of the low-pass filtered frames are determined to be zero-motion frames, then a smooth trajectory is estimated for the for the zero-motion frames. Jitter is removed from the zero-motion frames using the smooth trajectory and frame warping is applied to the zero-motion frames with jitter removed.

20 Claims, 7 Drawing Sheets

## TRAJECTORY PLANNING FOR VIDEO STABILIZATION

CROSS-REFERENCE TO RELATED APPLICATION

This patent application is a U.S. National Phase Application under 35 U.S.C. § 371 of International Application No. PCT/CN2014/086927, filed Sep. 19, 2014, entitled TRAJECTORY PLANNING FOR VIDEO STABILIZATION.

FIELD

The present description relates to stabilizing video and in particular to detecting motion in successive video frames to stabilize video that has no motion.

BACKGROUND

Small digital cameras have become so inexpensive as to be offered on a wide range of portable and wearable devices from watches, to helmets, to computing tablets, to media players to cellular telephones of all kinds. These cameras are particularly convenient for taking video of high action scenes where a larger camera is impractical or intrusive. For professional video, the camera is usually mounted to a stable platform ranging from a simple tripod, to a tracked rail dolly, jib, or crane. Some of these platforms have stabilizers to keep the camera level and aimed as it is being moved and even to counter quick motions and jitter. When the camera is handheld, however, the photographer may not be able to provide a stable platform. Similarly a camera mounted to a helmet, vehicle, or other moving platform will be subject to movement and jitter as well, unless it is stabilized.

Stabilizers are normally large, heavy, and delicate, so video stabilization processing techniques have been developed. These techniques try to remove unwanted motion after the video is captured. The techniques also try to avoid removing wanted motion. On the one hand, the photographer's hand might shake or the bicycle rider may hit a bump. On the other hand, the photographer may sweep the camera across a scene, or move to view a different subject. For action sequences, there can be a great amount of motion as the camera experiences the action with the photographer. One common video stabilization technique is to apply a low-pass filter, such as a Gaussian filter, to the images of a video sequence. This filter tries to isolate fast (or high frequency) movements from slow movements and then compensate only for the fast movements. In principle, the movement from a shaky hand is removed while the movement from panning across a scene or moving to a different subject in the scene is not removed.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1A:
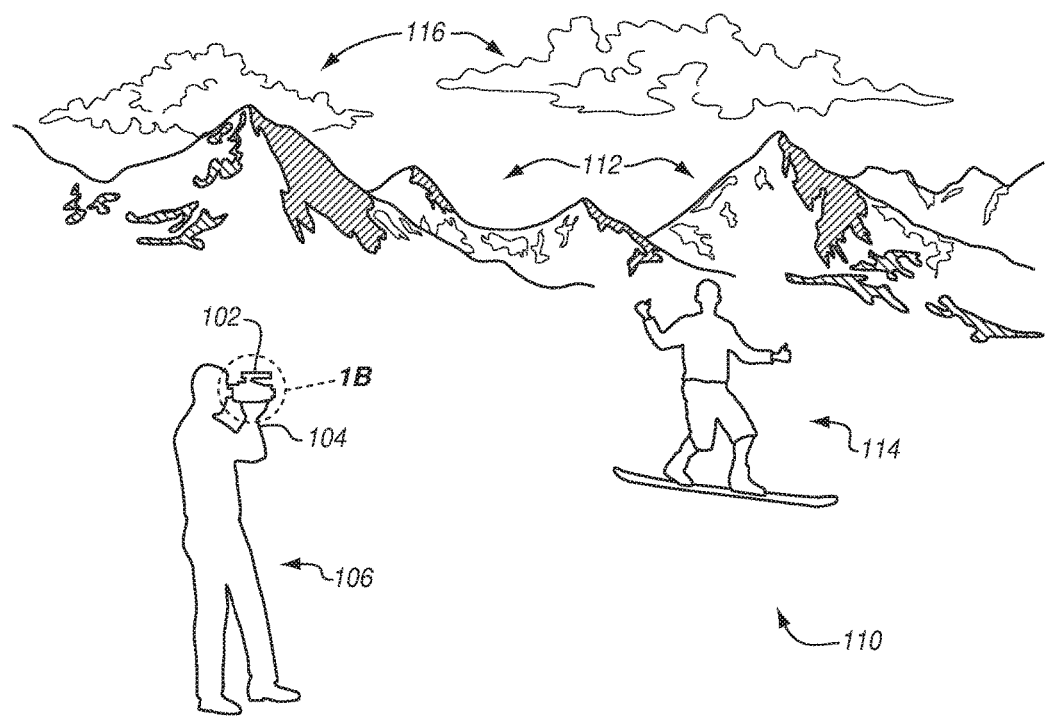
FIG. 1A is a diagram of capturing zero-motion video subject to jitter.

Video stabilization (VS) aims to smooth a shaky camera trajectory in a captured video sequence so that the jitter motion in the input video can be effectively removed. Many of the low-pass filter or Gaussian filter techniques for smoothing do not compensate for all motions and are limited by the size of the missing areas that are required to correct for motion.

By design, a low-pass filter can only reduce some jitter motions. It cannot accurately and completely remove all jitter. Some amount of jitter is easily overlooked by a viewer in a video for which the camera has a low frequency movement, such as a sweep or a pan. However, when the video has no intentional camera motion, the small jitter movements are more obvious. In a zero motion scenario, small jitter movements can easily be observed. As an example, if the background of a scene reflects a shaky hand or a shaky camera holder, this will easily be seen when watching the video.

The movement of the scene in a video sequence is referred to as the trajectory. The movement of the camera can be estimated by analyzing the movement of the scene. The trajectory includes both high and low frequency motion. Stabilizing the video to reduce quick or shaky motions, such as jitter, is referred to as smoothing the trajectory. Because it is not always known which elements in a scene are moving and which elements in a scene appear to move because of the camera's motion, trajectory smoothing is based on an estimate of the actual unknown trajectory. The estimated trajectory is estimated based on analyzing the changes between successive frames of the video. A trajectory prediction may also be made by considering the estimated trajectory for previous frames and then predicting the trajectory for future frames. This is commonly done by extrapolating the estimated trajectory to later times, but the trajectory may be predicted in many other ways.

To smooth the trajectory, the frames in the video are adjusted to compensate for unwanted camera movement. If the camera has moved up, for example, four pixels from one frame to the next, then, during frame warping, the next frame is shifted down four pixels to compensate. When a frame is shifted, then there will be an area of the frame that is missing. Missing areas limit the range of frame warping. When for example, an upward vertical movement of e.g. 4 pixels is detected between frames, ideally the VS technique will move the entire frame 4 pixels downward to compensate for the jitter movement. These lower 4 rows of pixels are missing from the normal video sequence.

The missing area can easily be added if the frame has 4 additional bottom rows of pixel information that have not been included in the video. For this reason, video frames are usually cropped on all four sides leaving a transparent region that is the edge around the cropped video. The transparent region provides extra rows and columns that can be used to fill in the missing areas when necessary to compensate for camera motion. The size of the missing areas is closely related to the low-pass filter strength. The smoother the filtered trajectory, the larger the missing areas. However, when the size of the missing area is large, the cropping-based method will significantly reduce the user's visible area, i.e. the number of pixels in the actual video. Normally, the size of the missing areas is pre-determined well in advance by the manufacturer or by standards. Alternatively, the missing areas can be filled by generating new pixels based on the pixels at the edge of the frame, for example, by painting in the missing pixels. However, in-painting based methods tend to generate obvious artifacts.

The maximum size of the missing area is normally pre-determined. This limits the amount of jitter that can be compensated for each input video frame. When the difference between the original camera trajectory and the filtered trajectory (i.e., the estimated jitter value) is larger than the compensation limit, the jitter of this frame will be constrained to the compensation limit; this frame is called a jitter-clamped frame. Having jitter-clamped frames often leads to a discontinuity in the smoothed trajectory and finally degrades the visual quality of the stabilized video by creating a so-called "sudden jump" artifact. These jump artifacts can be addressed by appropriately planning the trajectory.

FIG. 1A is a diagram showing an example situation for recording video using a video camera that is not stabilized. A camera 102 is held in the hand 104 of a videographer 106 who is aiming the camera at a scene 110. The camera is likely to shake or jitter in the hand of the videographer because it is not stabilized. This may also occur if the videographer has mounted the camera to a larger platform (not shown) such as a vehicle which is not stabilized. The videographer has aimed the camera at a scene which has a fixed mountain background 112 and a moving foreground object 114 such as a skateboard rider. The scene also has moving background clouds 116. This is provided as a common example but the elements in the scene may be varied to suit the desires of the videographer.

Figure 1B:
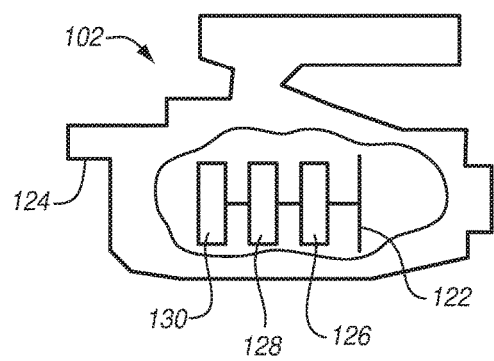
FIG. 1B is a diagram of a video capture device.

The video camera 102 is shown in an expanded diagram view in FIG. 1B with a lens to image the scene onto an image sensor 122. There may be shutters, controllable aperture diaphragms, filters, shades and other elements (not shown) between the lens and the image sensor. The image sensor data is provided to a sample and hold circuit 126 to convert the data into a set of pixel values. The pixel values are then processed in an image processor 128. The system is controlled by a general purpose processor 130 which presents a user interface and image view on a touchscreen display 124 and may present one or more additional user interface and communication elements. The camera may have many more or fewer components than shown, depending on the particular implementation.

To stabilize the video more accurately, zero motion videos may be distinguished from videos with intended motion. The difference may be determined using two or more successive frames. There are at least three different cases to be distinguished. These may be referred to: 1) true zero motion detection; 2) zero motion transition; and 3) false zero motion detection.

True zero motion may be described as having no intended motion in the shaky video. This may occur when shooting a video of a landscape or a shooting a fixed object, such as a painting or sculpture. In such a case, small random movements can be observed in two successive frames after Gaussian filtering.

For zero motion detection a low-pass filter is applied to the original camera trajectory in a trajectory smoothing stage and the low-pass filter outputs a filtered trajectory. Since the low-pass filter removes most of the jitter motion, the filtered trajectory primarily shows the real intended motion of the camera. Consequently, video sequences can be determined to be either zero-motion video or non-zero motion by analyzing features of the filtered trajectory.

Figure 2:
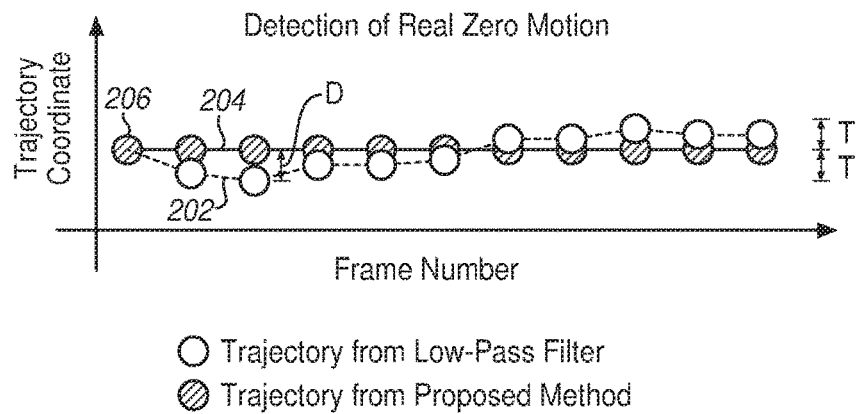
FIG. 2 is a diagram of zero-motion video and a planned trajectory according to an embodiment.

An example of zero motion is shown in FIG. 2. FIG. 2 is a chart of trajectory coordinates on the vertical axis against successive frames on the horizontal axis. Each dot represents a different frame in a sequence of frames from left to right. There are two lines of successive dots. One line 202 shows trajectory coordinates that result from the raw input video after a low-pass filter. This will be referred to as the predicted trajectory. The second line of dots 204 shows what the trajectory coordinates would be if there were no motion. This is a smoothed trajectory that has been derived from the input video based on the assumption that there is no motion. This smoothed trajectory is the refined or planned trajectory and when applied to the predicted trajectory will make the video more smooth and stable.

The dots may be used to show a method to determine whether the frame sequence is zero motion or not. Each of the dots in the low-pass filter video 202 shows a small movement from the coordinates of the dot immediately before it and the dot immediately after it on the line. The gap or distance between coordinates of adjacent dots may be used to determine if the movement is simply some jitter or other unintended effect or some intended motion. In other words, one method is to compare the gap between the last low pass filter coordinate and the current low pass filter coordinate. If the displacement or gap (D) is less than the threshold (T), then the line the video is determined to be zero motion video. If the gap is more than the threshold, then the video is declared to be motion video. The planned trajectory is imposed over the video to stabilize the video and remove the motion. In other words, the actual trajectory after low-pass filtering 202 is adjusted using frame warping so that it matches with the planned straight or zero motion trajectory 204.

Alternatively, the two lines may be compared to each other. As shown, the planned trajectory shows a gap (D) between the actual low-pass filtered predicted trajectory 202 and the planned trajectory 204 after two successive frames. The gap is smaller than a threshold (T). Based on the threshold comparison, the video represented by the line 202 may be determined to be a zero motion video. When the gap between the two filtered adjacent trajectories is smaller than a pre-defined threshold, it will be determined that no intended motion exists between these two frames. Therefore, the planned trajectory 204 is used for video stabilization instead of the low-pass filter output 202.

The comparison of coordinates may be performed in a variety of different ways. First, the coordinates of one low-pass filtered frame may be compared to the coordinates of the corresponding smooth trajectory frame as shown. This may be repeated for each frame. However, in performing such a comparison, there may be an allowance made for extreme values. If the camera were suddenly dipped in one or two frames and then returned to the original position, the sequence may still be a zero-motion sequence. Accordingly, a mean may be used to compare the coordinates. In one example, the differences between a short set of frames, e.g.

five or ten of the low-pass filtered frames and the corresponding planned trajectory frames may be determined. A mean of the differences may then be taken and compared to the threshold to determine if it is a zero-motion sequence. The variance, e.g. the mean square of the deviations from the arithmetic mean, may also or alternatively be taken to determine if it is a zero-motion sequence.

As a further alternative, a mean or a variance or both of the coordinate values for a short set of frames, e.g. five or ten of the low-pass filtered predicted trajectory frames and a mean of the corresponding refined or planned trajectory frames may be determined. The difference between the two means may then be compared to the threshold to determine if it is a zero-motion sequence.

Figure 3:
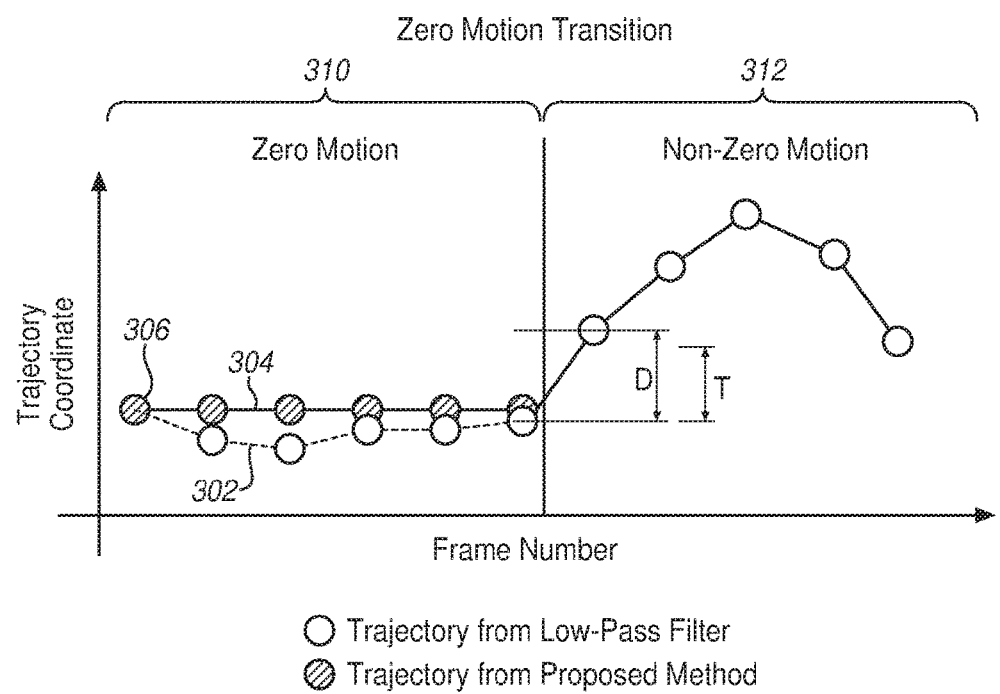
FIG. 3 is a diagram of zero-motion video and a transition to motion video with a planned trajectory according to an embodiment.

As a further alternative, a mean or a variance or both of the coordinate values for a short set of frames, e.g. five or ten of the low-pass filtered predicted trajectory frames may be compared to each of the frames in the short set of frames. If the difference between the mean and any one particular frame is less than a threshold, then the sequence may be determined to be a zero-motion sequence for that frame. When one or two consecutive frames exceed the threshold, then the sequence may be determined to have made a transition to being a motion sequence with those frames. This is shown in FIG. 3. If none of the frames are within the threshold to the mean, then the entire short set of frames is a motion sequence.

The planned trajectory coordinate value may be determined in a variety of different ways. A mean coordinate value may be used as the final smoothed trajectory for the current frame. The mean value may be initialized with the first low-pass filtered frame or with a sequence of frames of the predicted trajectory. As shown, the video sequence starts with a first frame 206 in which the coordinates of the predicted trajectory and the coordinates of the planned trajectory are the same. Since this is a zero motion case in which the only motion is due to unintended camera movement, the zero motion planned trajectory is used to completely remove jitter from the video sequence. In brief, after the low-pass filter, the video is analyzed and, in this case, an additional jitter removal is performed.

FIG. 3 is a chart similar to that of FIG. 2 but with a different video sequence. There may be multiple camera motions combined in one video sequence. As a result, the system adaptively transforms from a zero motion mode to a non-zero motion mode when the criterion of zero motion is no longer satisfied.

Here there is a first zero motion section 310 of the video sequence and a second non-zero motion section 312 of the video sequence. In between these two sections is the transition from zero motion to non-zero or positive motion. The zero motion section 310 is similar to that of FIG. 2 because the movement between two successive frames is smaller than the threshold (T).

In the second section 312, the movement (D) of two successive frames is larger than the threshold. This then corresponds to some motion of the camera other than jitter. The movement is too large to compensate for with jitter rejection or stabilization techniques. As a result, there is no modification to the low-pass filter result. The mean value is then updated through this sequence with the low-pass filter result so that zero motion detection can continue.

In a similar way, the detection of a transition may be used in the context of FIG. 2 may be used to determine whether the video is zero motion video or motion video. In the same way that the gap (D) being larger than the threshold (T) determines the transition, the same condition may be used to determine that video is not zero motion video in the first place.

Figure 4:
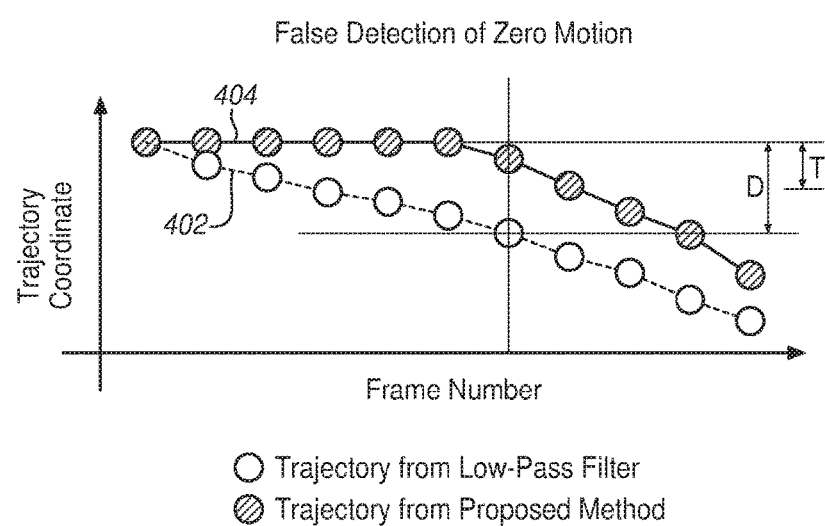
FIG. 4 is a diagram of motion video that may be appear to be zero-motion video and a planned trajectory according to an embodiment.

The example of FIG. 4 corresponds to a case in which a zero-motion detection is a false alarm. When the camera is consistently taking small movements in the same direction as shown by the low-pass filtered line of dots 402, the gap between the predicted trajectory and the estimated planned trajectory on any two adjacent frames is small. Because the difference in coordinates between any two frames is small and less than the threshold, the system may interpret the sequence as zero motion video. However, if the predicted trajectory continues in the same direction, it is not a jitter or shake but an intentional slow movement of the camera. This is a false alarm for zero-motion detection that will deteriorate the visual quality of the stabilized video if treated as zero-motion video.

The gap between the planned trajectory and the predicted trajectory from the low-pass filter may also be monitored over multiple frames of the video sequence. If a large accumulated gap (D) is detected, then the planned trajectory may be adjusted to follow the camera's intended motion. The large gap detection may be combined with a zero motion detection and a false alarm detection.

FIG. 4 is a chart in which the predicted trajectory coordinates for a low-pass filtered sequence of frames is shown as a row of dots 402 for each frame. The planned trajectory, based on zero motion is also shown as a second sequence of dots 404. The actual video sequence 402 shows a small uniform movement over many frames. To prevent a false zero motion detection, the gap between the mean value and the predicted trajectory may be checked for each frame. When that gap (D) is larger than the threshold (T), the mean value for the planned trajectory 404 is updated. The motion is not zero and the mean value may be used as the final output.

By comparing the trajectories, a sequence of frames in the low-pass filtered predicted trajectory is compared to a corresponding sequence of frames in the planned or estimated trajectory. For intended motion, the frames of the predicted trajectory will diverge from the frames of the planned trajectory. FIG. 4 is showing that instead of comparing each frame individually against each other frame, the trajectories may be compared. This may be done using a mean of the coordinates for each trajectory as described above. Alternatively, as in FIG. 4, the trajectories are compared. In the illustrated example, each frame of the predicted trajectory is farther from the planned trajectory and farther in the same direction. The planned trajectory is based on zero motion. As the predicted trajectory moves farther from the planned trajectory, it can be determined that the predicted trajectory is not zero motion.

The planned trajectory 404 of FIG. 4 starts initially as a straight line but as the predicted trajectory 402 continues to move away from the planned trajectory, the planned trajectory is adjusted. The actual or predicted trajectory is in the rough form of a downward sloping smooth curve in the illustrated example. The planned trajectory is similarly estimated as a smooth curve that slopes downwards at a rate that is estimated to be the same as that of the predicted trajectory. This slope may change as further adjustments are made over time.

Figure 5:
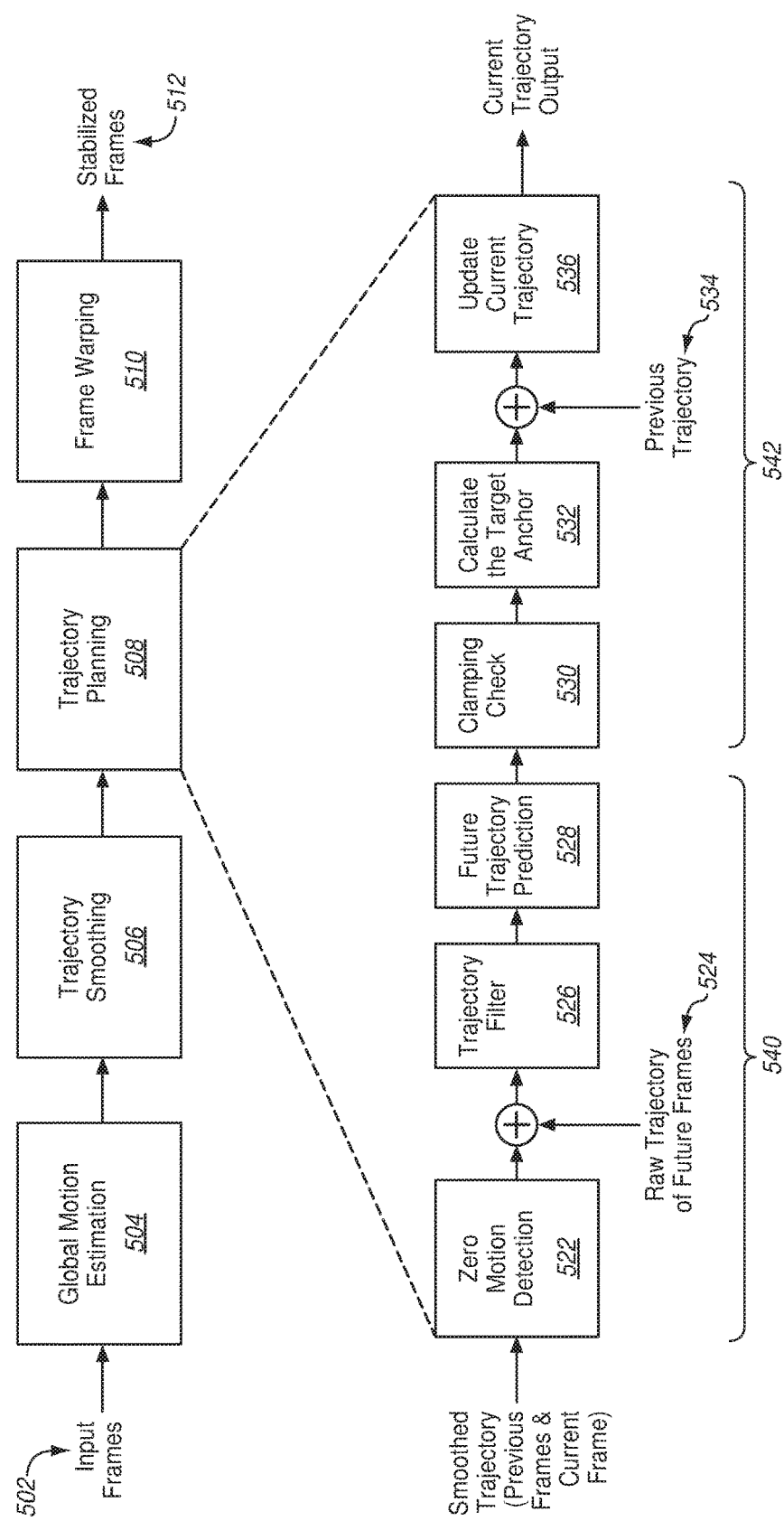
FIG. 5 is a block diagram of smoothing a video sequence with zero-motion estimation according to an embodiment.

FIG. 5 is a block diagram of stabilizing a sequence of video frames as may be performed in a camera or in later post-processing after the video has been collected and sent on to a separate processing engine such as a video workstation or editing system. The input frames 502 of the video sequence are applied to a global motion estimation block 504. Global motion estimation is used to find the dominant motion between each pair of adjacent frames in the input video. Based on these global motions from one frame to the next, the camera trajectory can be generated. If the camera's movement has undesirable shaky motions, the camera trajectory generated by the global motion estimation will be affected by the random jitters (or any other noises). The estimated global trajectory will be wrong by an amount that depends on the jitter and other noise.

After determining a trajectory, the perturbations caused by jitter and other noise are treated with a trajectory smoothing block 506. The trajectory smoothing block produces the predicted trajectory. This trajectory smoothing may be done by applying a low-pass filter. Any quick motions are filtered out so that primarily only intended movements remain in the sequence of video frames. In performing trajectory smoothing, the random jitters may be estimated by subtracting the filtered trajectory from the original one.

The filtered predicted trajectory from the smoothing block 506 is provided to a trajectory planning block 508 described in more detail below. This produces the planned trajectory. Finally the calculated jitter values are used to compensate the camera's shaky movement in a frame warping block 510 by applying the planned trajectory to the input video frames.

The trajectory planning block 508 is placed after the camera trajectory smoothing stage 506. In the trajectory planning stage, the filtered trajectory is redesigned. Shaky videos without any intended motion can be fully compensated. In addition, the discontinuity of the smoothed trajectory between an ordinary frame and a jitter-clamped frame can be reduced as much as possible.

The trajectory planning stage is expanded into several different blocks 522, 524, 526, 528, 530, 532, as shown beneath the trajectory planning stage 508 in FIG. 5. The whole trajectory planning stage can be described as having two parts. The first part 540 is the trajectory planning for zero motion video and the second part 542 is to eliminate any sudden jump artifact due to jitter motion clamping.

The first part includes zero motion detection 522 which may be performed in a variety of different ways. In the example of FIG. 2, the low-pass filtered predicted trajectory frames are compared to a stable planned trajectory. If the difference between the coordinates of the two trajectories is small and within a threshold, then the video sequence may be declared to have a zero motion trajectory. This determination may be combined with a detection of transitions as described in the context of FIG. 3 and a false detection test as described in the context of FIG. 4.

After motion refinement in the zero motion detection module 522, the video stabilization can provide quality stable video for most scenarios. However, some jitter motion clamping may still degrade the visual quality. The potential for motion clamping may, however, be predicted. Using the prediction, the compensation motion may be adjusted in advance to generate a still more stable video sequence as an output.

Figure 6:
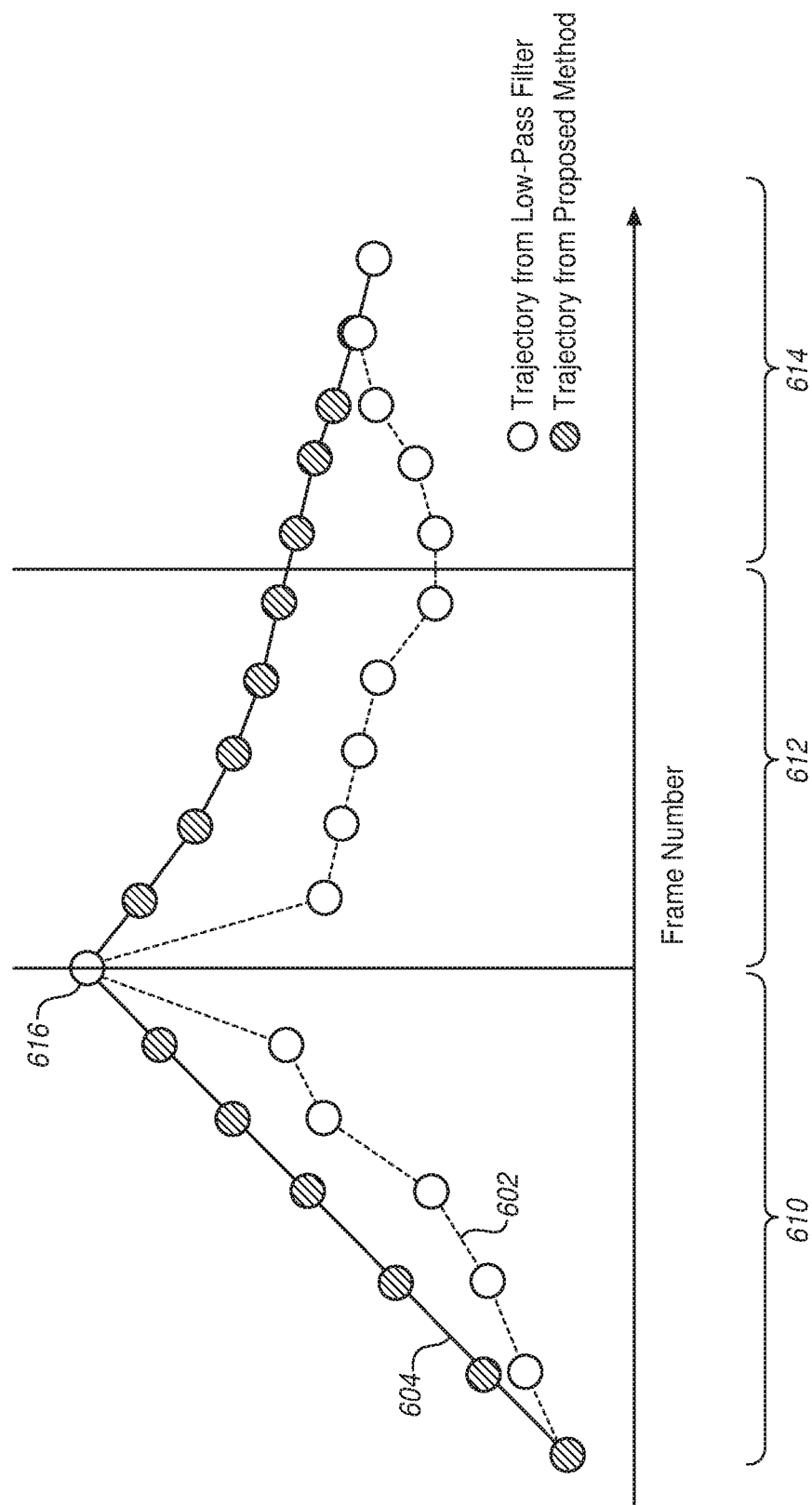
FIG. 6 is a diagram of motion video subject to clamping and a planned trajectory according to an embodiment.

FIG. 6 is a chart similar to those of FIGS. 2, 3, and 4 to show an example of trajectory planning. The predicted trajectory that is received from the low-pass filter 506 is presented as a first line of dots 602. Each dot reflects a coordinate position for a particular video frame. The line advances in time to the left with each dot representing a successive frame through the video sequence. In this example, there are three regions with different characteristics with respect to clamping. In a first region 610, clamping is detected. The video frames are anchored to the clamped position. In the second region 612, there is estimated to be no future clamping. The predicted trajectory is plotted using coordinates of two spaced apart video frames, a previous frame and a frame that, in this example, is five frames forward from the previous frame. In the third region, there are not enough future frames to predict the trajectory so the sequence is anchored to the last frame. After more frames are received then the planned trajectory can be extended and used in the same manner as in the first 610 and second regions 612.

To begin with, the low-pass filter is applied to the original predicted trajectory of the future frames to get their predicted trajectory from the low-pass filter module 506. These frames are indicated as the jittery line 602 of frames. The raw trajectory of the future frames 524 is supplied into the processing system. This trajectory is filtered 526 so that a future trajectory can be predicted 528. Based on the difference between the original trajectory from 522 and the filtered trajectory from 526, a clamping check 530 can be performed. The clamping check predicts whether there is an upcoming jitter-clamped frame. Once any jitter-clamped frames are detected, a smoothed trajectory may be planned to avoid any sudden jump when the clamped frame occurs. The trajectory planning may be updated for each frame to greatly reduce any trajectory discontinuity.

After the clamping check 530 predicts any future clamped frames, then a target anchor 532 can be adjusted based on the possible clamping. Using the new target anchor and the previous trajectory 534, the trajectory can be updated 536 to adapt to the detected clamping. The updated trajectory is then output into the frame warping 510 to produce the stabilized video frames 512.

One simple way to perform the trajectory planning 508 is to plot a line using one previous position and the current trajectory anchor as inputs. However, the shape of a newly plotted trajectory can also be used if some other frames are selected from the filtered trajectory. A trajectory may be predicted in a variety of ways based on a previous position and a later position from a future frame. Such a curve may be produced as a least squares fit, a Bezier curve, or in a variety of other ways. After fitting a curve to the coordinates, the position of the current frame may be calculated and output as the final result after a clamping check again.

Returning to FIG. 6, in the first region 610, the example predicted trajectory 602 from the low-pass filtered video frames is plotted with a slow upward movement and some irregular jitter. A refined or planned smoothed trajectory 604 follows the same general direction but without precisely matching the coordinate positions of the actual frames. In the second region 612, the video frames show a slow downward movement. As a result, the frame coordinates return to a position near the middle of the first region's trajectory. For this reason, there will be no clamping. The planned trajectory can be made based on some number N of future frames. In the second region, five frames are used as an example to predict any motion clamping.

The planned trajectory 604 climbs to a maximum point 616 at which clamping could occur. However the planned trajectory based on the next 5 frames, in the second region, shows that this remains a peak and the video coordinates move back toward the earlier position. In the third region, the planned trajectory is not fully estimated until more frames are received.

Figure 7:
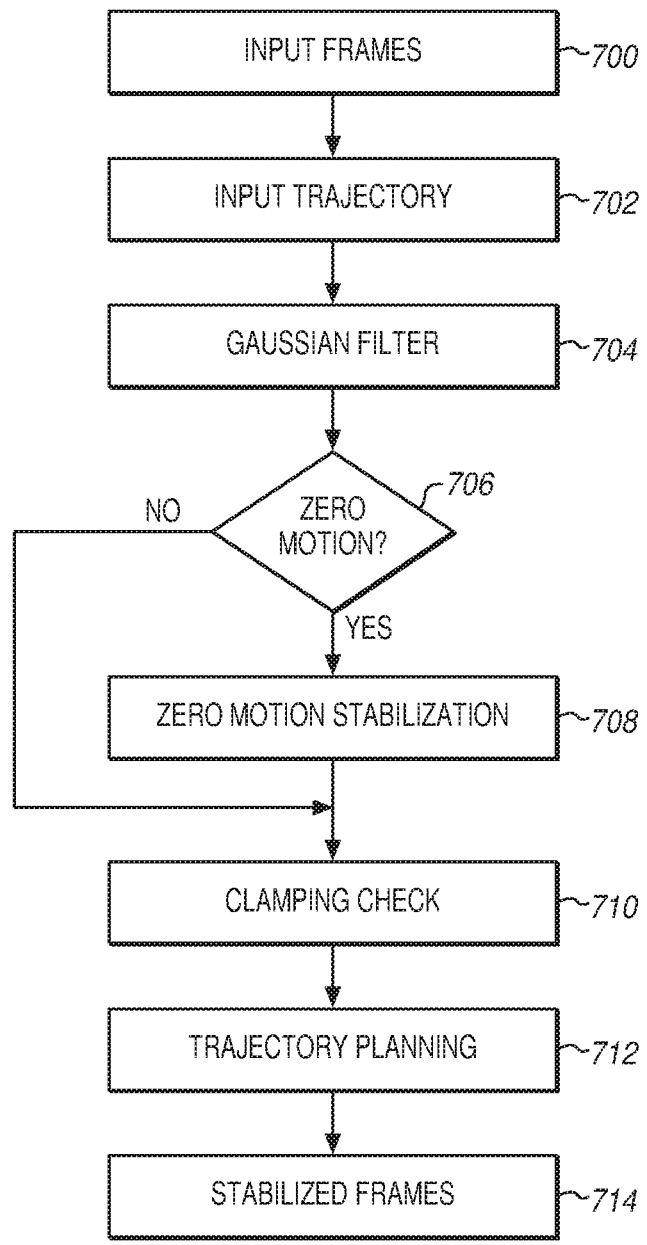
FIG. 7 is a process flow diagram of smoothing a video sequence with zero-motion estimation according to an embodiment.

FIG. 7 is a process flow diagram showing many of the operations described herein. At 700 input frames are received from storage or from a video camera. The frames are buffered so that present and future frames are available to the various processes described herein. At 702, the input trajectory is determined based on analyzing the received frames. This may be done using coordinates as shown in the example trajectories of FIGS. 2, 3, 4, and 6. A Gaussian filter 704 is applied to the trajectory to filter out high speed jitter between frames but to retain low speed intentional movement of the camera.

The filtered video frames are then supplied to zero motion detection 706. If the video is determined to be a zero motion video, then the frames are further stabilized 708 based on a selected anchor point. This eliminates even small movements that the Gaussian filter cannot remove. As an example, the smoothed trajectory from the zero motion stabilization is projected into future frames, for example, the next five frames. This is compared to the Gaussian filtered next five frames to characterize the video as zero motion or not.

Jitter motion clamping may also be performed during the zero motion compensation. This may occur when the jitter exceeds the range of compensation that is available. In that case, the sudden jump or a small shakiness can be observed in the output video when the smoothed trajectory transitions from one anchor point to the next.

From zero motion stabilization 708 the video is fed to a clamping check 710. If the video is not zero motion 706, then the zero motion stabilization 708 is skipped to move on to the clamping check 710. With the clamping check, the trajectory may next be adjusted at 712 to accommodate any clamping. Jumps are avoided or planned so that they are less noticeable in the stabilized video. The Gaussian filtered frames of the predicted trajectory and the next available future frames are compared.

After checking for clamping the trajectory planning 712 is to further smooth the clamped trajectory. The trajectory is planned to avoid jumps between anchor points or to minimize the jumps. The trajectory may be planned using the processed position of the previous frame to plot the new trajectory. The processed position may be from the Gaussian filtered frames or from the zero motion stabilization frames depending on whether zero motion is detected at 706. The smoothed trajectory of the next five frames may be estimated from the processed position. If clamping is found in the next five frames, then the current trajectory is recalculated using the previous position and the clamped position. If clamping is found in more than one projected future frame, then the anchor may be calculated using those multiple estimated clamped positions.

On the other hand, if there is no clamping found in the next five frames, then the current trajectory is recalculated using the previous position and the future position at the fifth successive frame.

As described herein several techniques may be combined to improve the perceived quality of video stabilization. Motion trajectory planning is applied to reduce the motion discontinuity of a stabilized video and to improve the visual quality of video stabilization. Zero motion scenarios are detected. False alarm cases for zero motion detection are detected. The camera trajectory is locked when zero motion is detected and when zero motion is no longer detected the camera trajectory fades out from the lock mode. The future trajectory for a video is predicted based on a low-pass filtering framework. Trajectory planning is performed in a sliding window of one or several previous frames and one or several future frames. Potential jitter clamping is detected in future frames and the target anchor is adaptively calculated for trajectory planning. Trajectory planning is performed to output a constant, linear or parabolic trajectory in the sliding window.

Figure 8:
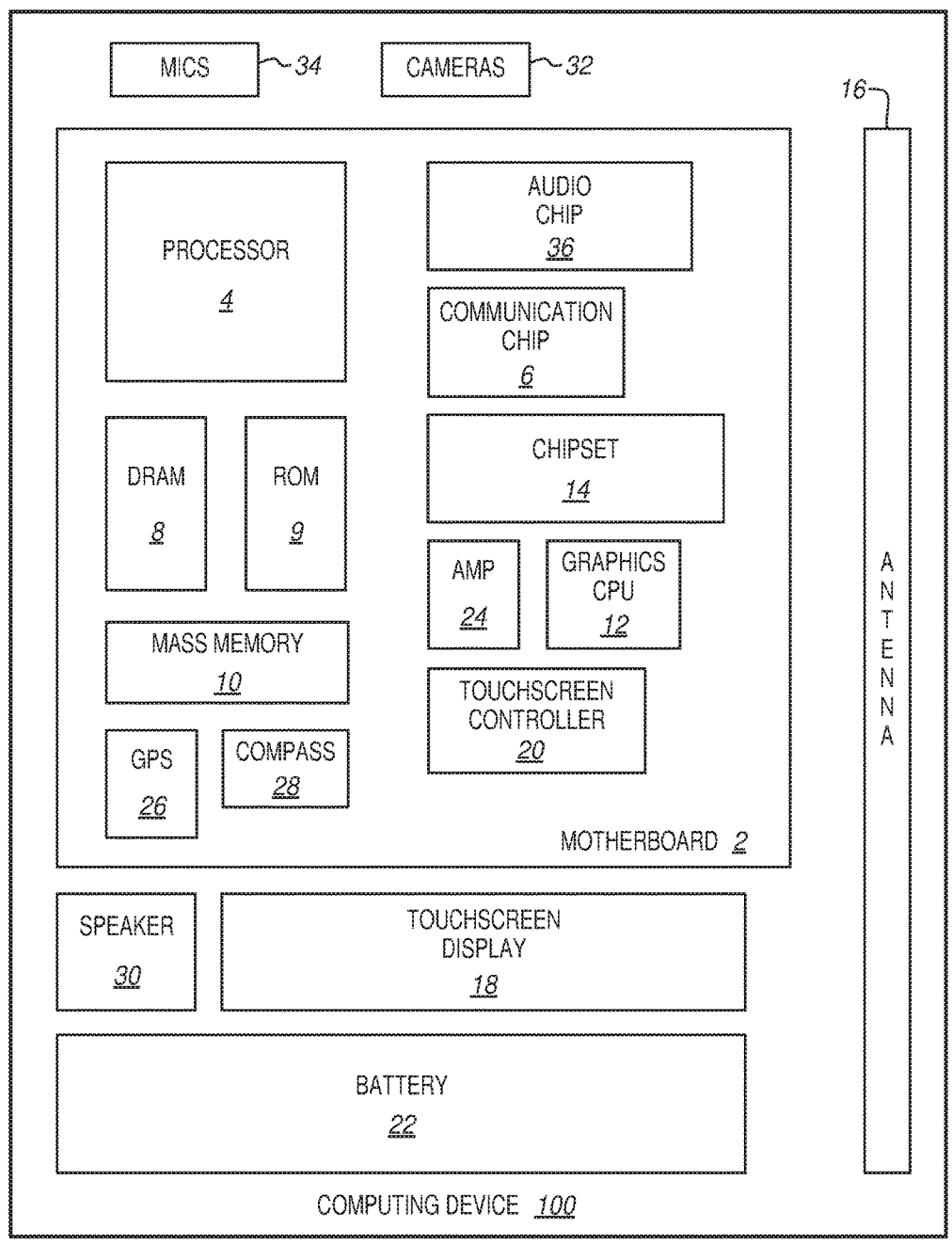
FIG. 8 is a block diagram of a video capture device incorporating video stabilization according to an embodiment.

FIG. 8 illustrates a portable video device 100 in accordance with one implementation. The video device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, video device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The communication package 6 enables wireless and/or wired communications for the transfer of data to and from the video device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The video device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The cameras 32 may include all of the components of the camera 102 of FIG. 1B or share resources, such as memory 8, 9, 10, processing 4 and user interface 12, 20, with other video device components and functions. The processor 4 is coupled to the camera and to memory to receive frames of video and stabilize the frames based on predicted trajectories as described.

In various implementations, the video device 100 may be a video camera, a digital single lens reflex or mirror-less camera, a cellular telephone, a media player, laptop, a netbook, a notebook, an ultrabook, a smartphone, a wearable device, a tablet, a personal digital assistant (PDA), an ultra mobile PC, or a digital video recorder. The video device may be fixed, portable, or wearable. In further implementations, the video device 100 may be any other electronic device that records a sequence of image frames and processes data.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a method that includes receiving a sequence of video frames, low-pass filtering the video frames, determining whether a subset of the low-pass filtered frames are zero-motion frames, estimating a smooth trajectory for the zero-motion frames, removing jitter from the zero-motion frames using the smooth trajectory, and applying frame warping to the zero-motion frames with jitter removed.

In further embodiments, determining comprises comparing coordinates of a selected low-pass filtered frame to an adjacent low-pass filtered frame in the sequence of video frames.

In further embodiments, comparing comprises determining the distance between coordinates of the selected frame and the adjacent frame and comparing the distance to a threshold, wherein if the distance is less than the threshold then the subset of frames are determined to be zero motion frames.

In further embodiments, determining the distance and comparing the distance to a threshold is performed for each frame of the subset and, if a distance is greater than the threshold, then a transition to motion video is determined.

In further embodiments, determining comprises determining a first trajectory of the subset of low-pass filtered frames, determining a second zero-motion trajectory, and comparing the first trajectory to the second trajectory.

In further embodiments, comparing comprises comparing coordinates of frames of the first trajectory to corresponding frames of the second trajectory and if the coordinates are within a threshold distance then determining that the subset of low-pass filtered frames are zero-motion frames.

In further embodiments, comparing coordinates comprises comparing a mean of a short sequence of coordinates of frames of the first trajectory to a mean of coordinates of corresponding frames of the second trajectory and if the means are within a threshold distance then determining that the subset of low-pass filtered frames are zero-motion frames.

In further embodiments, comparing coordinates comprises comparing a variance of a short sequence of coordinates of frames of the first trajectory to a variance of coordinates of corresponding frames of the second trajectory and if the variances are within a threshold distance then determining that the subset of low-pass filtered frames are zero-motion frames.

In further embodiments, if the subset of low-pass filtered frames are determined to not be zero-motion frames then applying frame warping to the low-pass filtered frames.

In further embodiments, the smooth trajectory is based on coordinates of a frame that is selected as an anchor point, the method further including checking for future clamping and updating the smooth trajectory based on the clamping check.

In further embodiments, updating the smooth trajectory comprises selecting a past frame of the output frames and producing a curve between the past frame and the anchor point.

Some embodiments pertain to an apparatus having a filter to receive a sequence of video frames and to low-pass filter the video frames, a zero motion detector to determine whether a subset of the low-pass filtered frames are zero-motion frames, trajectory smoothing to estimate a smooth trajectory for the zero-motion frames, and frame warping to remove jitter from the zero-motion frames using the smooth trajectory.

In further embodiments, the zero motion detector compares coordinates of a selected low-pass filtered frame to an adjacent low-pass filtered frame in the sequence of video frames.

In further embodiments, the zero motion detector compares by determining the distance between coordinates of the selected frame and the adjacent frame and comparing the distance to a threshold, wherein if the distance is less than the threshold then the subset of frames are determined to be zero motion frames.

In further embodiments, the zero motion detector compares by comparing a mean of a short sequence of coordinates of frames of the subset of frames trajectory to the selected low-pass filtered frame.

Some embodiments pertain to a computer-readable medium having instructions that when operated on cause the computer to perform operations that include receiving a sequence of video frames, low-pass filtering the video frames, determining whether a subset of the low-pass filtered frames are zero-motion frames, estimating a smooth trajectory for the zero-motion frames, removing jitter from the zero-motion frames using the smooth trajectory and applying frame warping to the zero-motion frames with jitter removed.

In further embodiments, if the subset of low-pass filtered frames are determined to not be zero-motion frames then the operations further comprising applying frame warping to the low-pass filtered frames.

In further embodiments, the smooth trajectory is based on coordinates of a frame that is selected as an anchor point, the operations further include checking for future clamping, and updating the smooth trajectory based on the clamping check.

In further embodiments, updating the smooth trajectory comprises selecting a past frame of the output frames and producing a curve between the past frame and the anchor point.

Some embodiments pertain to a computing device that includes an image sensor to record a sequence of video frames, a memory to store the sequence of video frames, a Gaussian filter to low-pass filter the stored sequence of video frames, a zero motion detector to determine whether a subset of the low-pass filtered frames are zero motion frames, a trajectory estimator to estimate a smooth trajectory corresponding to the subset of frames, and a trajectory planner to remove jitter from the subset of frames using the smooth trajectory if zero motion is detected.

In further embodiments, the zero motion detector compares coordinates of a selected low-pass filtered frame to an adjacent low-pass filtered frame in the sequence of video frames.

In further embodiments, the zero motion detector compares by determining the distance between coordinates of the selected frame and the adjacent frame and comparing the distance to a threshold, wherein if the distance is less than the threshold then the subset of frames are determined to be zero motion frames.

In further embodiments, the zero motion detector compares by comparing a mean of a short sequence of coordinates of frames of the subset of frames trajectory to the selected low-pass filtered frame.

In further embodiments, the smooth trajectory is based on coordinates of a frame that is selected as an anchor point, the trajectory estimator further checking for future clamping, and updating the smooth trajectory based on the clamping check.

In further embodiments, updating the smooth trajectory comprises selecting a past frame of the output frames and producing a curve between the past frame and the anchor point.

The invention claimed is:

1. A method comprising:
receiving a sequence of video frames;
low-pass filtering the video frames;
determining whether a subset of the low-pass filtered frames are zero-motion frames;
estimating a smooth trajectory for the zero-motion frames;
removing jitter from the zero-motion frames using the smooth trajectory; and
applying frame warping to the zero-motion frames with the jitter removed.

2. The method of claim 1, wherein the determining comprises comparing coordinates of a selected low-pass filtered frame to an adjacent low-pass filtered frame in the sequence of video frames.

3. The method of claim 2, wherein comparing comprises determining a distance between coordinates of the selected low-pass filtered frame and the adjacent low-pass filtered frame and comparing the distance to a threshold, wherein if the distance is less than the threshold then the subset of the low-pass filtered frames are determined to be the zero motion frames.

4. The method of claim 3, wherein the determining the distance and comparing the distance to the threshold is performed for each frame of the subset and, if the distance is greater than the threshold, then a transition to motion video is determined.

5. The method of claim 1, wherein the determining comprises:
determining a first trajectory of the subset of low-pass filtered frames;
determining a second zero-motion trajectory; and
comparing the first trajectory to the second trajectory.

6. The method of claim 5, wherein the comparing comprises comparing coordinates of frames of the first trajectory to corresponding frames of the second trajectory and if the coordinates are within a threshold distance then determining that the subset of low-pass filtered frames are zero-motion frames.

7. The method of claim 6, wherein the comparing coordinates comprises comparing a mean of a short sequence of coordinates of frames of the first trajectory to a mean of coordinates of corresponding frames of the second trajectory and if the means are within a threshold distance then determining that the subset of low-pass filtered frames are zero-motion frames.

8. The method of claim 3, wherein the comparing coordinates comprises comparing a variance of a short sequence of coordinates of frames of the first trajectory to a variance of coordinates of corresponding frames of the second trajectory and if the variances are within a threshold distance then determining that the subset of low-pass filtered frames are zero-motion frames.

9. The method of claim 1, wherein if the subset of low-pass filtered frames are determined to not be zero-motion frames then applying frame warping to the low-pass filtered frames.

10. The method of claim 1, wherein the smooth trajectory is based on coordinates of a frame that is selected as an anchor point, the method further comprising:
checking for future clamping; and
updating the smooth trajectory based on the clamping check.

11. The method of claim 10, wherein updating the smooth trajectory comprises selecting a past frame of the output frames and producing a curve between the past frame and the anchor point.

12. An apparatus comprising:
a filter to receive a sequence of video frames and to low-pass filter the video frames;
a zero motion detector to determine whether a subset of the low-pass filtered video frames are zero-motion frames;
trajectory smoothing to estimate a smooth trajectory for the zero-motion frames; and
frame warping to remove jitter from the zero-motion frames using the smooth trajectory.

13. The apparatus of claim 12, wherein the zero motion detector compares coordinates of a selected low-pass filtered frame to an adjacent low-pass filtered frame in the sequence of video frames.

14. The apparatus of claim 13, wherein the zero motion detector compares by determining a distance between coordinates of the selected low-pass filtered frame and the adjacent low-pass filtered frame and comparing the distance to a threshold, wherein if the distance is less than the threshold then the subset of the low-pass filtered frames are determined to be zero motion frames.

15. The apparatus of claim 13, wherein the zero motion detector compares by comparing a mean of a short sequence of coordinates of frames of the subset of frames trajectory to the selected low-pass filtered frame.

16. A non-transitory computer-readable medium having instructions that when operated on cause a computer to perform operations comprising:
receiving a sequence of video frames;
low-pass filtering the video frames;
determining whether a subset of the low-pass filtered video frames are zero-motion frames;
estimating a smooth trajectory for the zero-motion frames;
removing jitter from the zero-motion frames using the smooth trajectory; and
applying frame warping to the zero-motion frames with jitter removed.

17. The medium of claim 16, wherein if the subset of low-pass filtered video frames are determined to not be zero-motion frames then the operations further comprising applying the frame warping to the low-pass filtered video frames.

18. The medium of claim 16, wherein the smooth trajectory is based on coordinates of a frame that is selected as an anchor point, the operations further comprising:
checking for future clamping; and
updating the smooth trajectory based on the clamping check.

19. A computing device comprising:
an image sensor to record a sequence of video frames;
a memory to store the sequence of video frames;
a Gaussian filter to low-pass filter the stored sequence of video frames;
a zero motion detector to determine whether a subset of the low-pass filtered frames are zero motion frames;
a trajectory estimator to estimate a smooth trajectory corresponding to the subset of the low-pass filtered frames; and
a trajectory planner to remove jitter from the subset of the low-pass filtered frames using the smooth trajectory if zero motion is detected.

20. The computing device of claim 19, wherein the smooth trajectory is based on coordinates of a frame that is selected as an anchor point, the trajectory estimator further:
checking for future clamping; and
updating the smooth trajectory based on the clamping check.

* * * * *